(12) United States Patent
Di Virgilio et al.

(10) Patent No.: US 12,049,982 B2
(45) Date of Patent: Jul. 30, 2024

(54) STAND FOR SUPPORTING A PRINTING DEVICE

(71) Applicant: HEWLETT-PACKARD DEVELOPMENT COMPANY, L.P., Spring, TX (US)

(72) Inventors: Vito Di Virgilio, Sant Cugat del Valles (ES); Alba Farran Pascual, Sant Cugat del Valles (ES); Volker Seidel, Sant Cugat del Valles (ES)

(73) Assignee: HEWLETT-PACKARD DEVELOPMENT COMPANY, L.P., Spring, TX (US)

( * ) Notice: Subject to any disclaimer, the term of this patent is extended or adjusted under 35 U.S.C. 154(b) by 230 days.

(21) Appl. No.: 17/419,596

(22) PCT Filed: Jan. 30, 2019

(86) PCT No.: PCT/US2019/015858
§ 371 (c)(1),
(2) Date: Jun. 29, 2021

(87) PCT Pub. No.: WO2020/159493
PCT Pub. Date: Aug. 6, 2020

(65) Prior Publication Data
US 2022/0082204 A1    Mar. 17, 2022

(51) Int. Cl.
*F16M 11/24*    (2006.01)
*B41J 29/06*    (2006.01)
*F16M 11/22*    (2006.01)

(52) U.S. Cl.
CPC ............. *F16M 11/22* (2013.01); *B41J 29/06* (2013.01); *F16M 11/24* (2013.01)

(58) Field of Classification Search
CPC ....... F16M 2200/061; F16M 2200/063; F16M 2200/068; F16M 11/38; F16M 11/24; F16M 11/242; F16M 11/245
(Continued)

(56) References Cited

U.S. PATENT DOCUMENTS 3,501,120 A    3/1970    Daniel, Jr.
4,040,585 A    8/1977    Socas
(Continued)

FOREIGN PATENT DOCUMENTS

CN    101140005 A    3/2008
CN    206703927 U    12/2017
(Continued)

*Primary Examiner* — Alfred J Wujciak
(74) *Attorney, Agent, or Firm* — Jordan IP Law, LLC

(57) ABSTRACT

A stand for supporting a printing device, the stand comprising: a first leg and a second leg, the legs having upper ends for vertically supporting a printing device to horizontally span the legs above a supporting surface; a crossbar fixed to the first leg at a first crossbar fixation point and fixed to the second leg at a second crossbar fixation point; and a linkage connected between the first and the second leg, the linkage comprising a first link, a second link and a third link connected in series, wherein: the first link is connected to the first leg in use at a first leg connection point; the second link is connected to the second leg in use at a second leg connection point; and the third link is connected to the crossbar to pivot about a third linkage pivot point and to the first and second links at first and second linkage connection points on opposite sides of the third linkage pivot point.

12 Claims, 5 Drawing Sheets

(58) Field of Classification Search
USPC ... 248/163.1, 163.2, 164, 431, 188.1, 188.2; 108/50.01, 137, 156
See application file for complete search history.

(56) References Cited

U.S. PATENT DOCUMENTS

| | | | | |
|---|---|---|---|---|
| 4,927,127 | A * | 5/1990 | Lock | A61G 13/02 |
| | | | | 254/122 |
| 5,645,259 | A * | 7/1997 | Chen | A47B 3/12 |
| | | | | 108/118 |
| 6,234,089 | B1 * | 5/2001 | Zheng | A47B 3/087 |
| | | | | 108/115 |
| 6,375,135 | B1 | 4/2002 | Eason et al. | |
| 6,877,622 | B2 * | 4/2005 | Tsai | A47F 5/13 |
| | | | | 211/195 |
| 6,929,230 | B2 * | 8/2005 | Tsai | B65F 1/1415 |
| | | | | 248/129 |
| 7,131,364 | B2 * | 11/2006 | Brazell | B25H 1/04 |
| | | | | 248/676 |
| 8,424,470 | B2 * | 4/2013 | Volin | A47B 3/091 |
| | | | | 108/118 |
| 9,422,039 | B2 | 8/2016 | Smith et al. | |
| 2004/0231570 | A1 | 11/2004 | Landa | |
| 2005/0072354 | A1 | 4/2005 | Goodwin | |
| 2005/0121569 | A1 | 6/2005 | Willey | |
| 2005/0126658 | A1 | 6/2005 | Goodwin | |

FOREIGN PATENT DOCUMENTS

| | | |
|---|---|---|
| DE | 10332256 B4 | 6/2006 |
| JP | 2797222 B2 | 9/1998 |
| JP | 2001246803 A | 9/2001 |
| JP | 2008070547 A | 3/2008 |
| JP | 2009131635 A | 6/2009 |
| JP | 2014188824 A | 10/2014 |
| WO | WO-2016202856 A1 | 12/2016 |

* cited by examiner

STAND FOR SUPPORTING A PRINTING DEVICE

BACKGROUND

Printers are made in various sizes and shapes to suit different purposes. Large Format Printers (also known as wide format printers), are used to print on larger substrates, such as posters. Printing is often onto a roll-fed substrate having a width of around 40 cm or more.

Large Format Printers may include a relatively heavy printing device including a printing carriage that travels from side to side across the substrate to deposit a printing fluid onto the surface of the substrate. The relatively heavy printing device can be supported by a stand which may include legs vertically supporting opposite sides of the printing device to horizontally span the legs above a support surface.

BRIEF INTRODUCTION OF THE DRAWINGS

Examples of the disclosure are further described hereinafter with reference to the accompanying drawings, in which.

DETAILED DESCRIPTION

Figure 1:
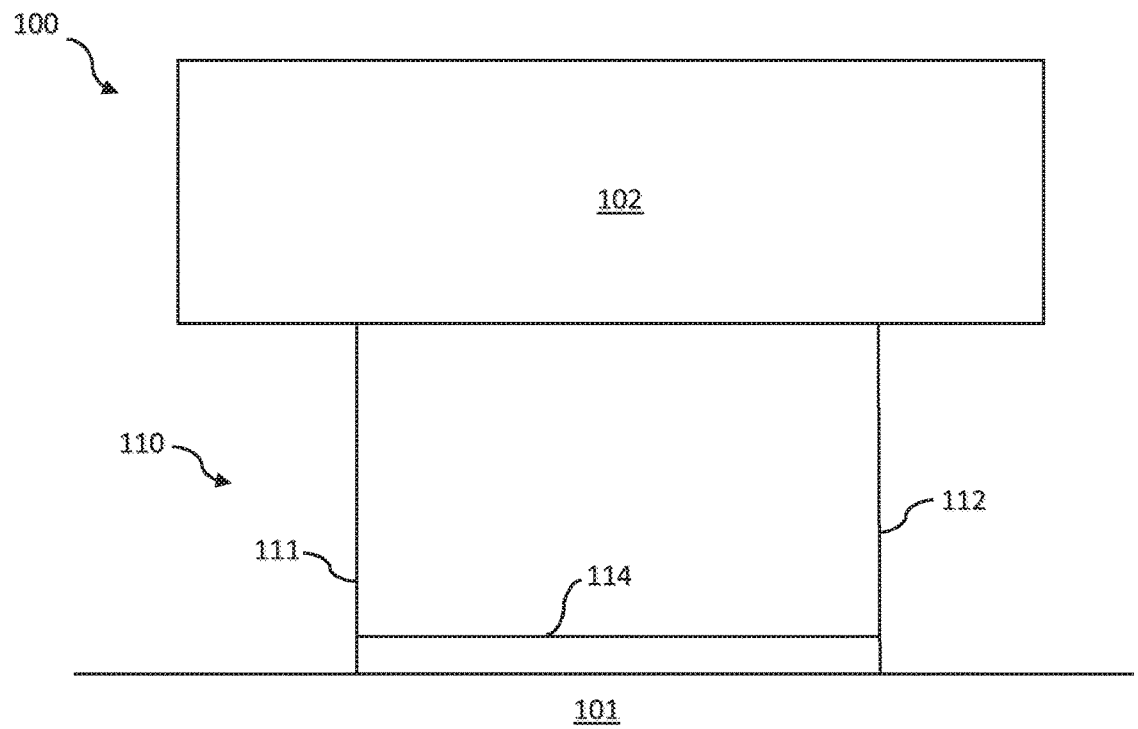
FIG. 1 shows a printer which includes a crossbar.

FIG. 1 shows a printer 100 which comprises a printing device 102 supported vertically above a supporting surface 101 by two legs 111 and 112. The two legs 111 and 112 have respective upper ends for vertically supporting the printing device 102 to horizontally span the two legs 111 and 112. A crossbar 114 is connected to and between the two legs 111 and 112 at first and second fixation points. The crossbar 114 may provide a fixed horizontal separation between the first leg 111 and the second leg 112 at the first and second fixation points. The supporting structure comprising the legs 111, 112 and the crossbar 114 may be considered to provide a stand 110 for the printing device 102. The legs 111, 112 and the crossbar 114 may be generally rigid links and together with the printing device 102 form a quadrilateral linkage. The legs 111, 112 and crossbar 114 may be fixed together with rigid fixing joints to attempt to maintain the shape of the quadrilateral linkage and the position of the printing device 102 standing on the supporting surface 101.

The printing device 102 may contain a printing carriage (not shown) that traverses the printing device 102 when in use (e.g. printing on a substrate). The carriage itself can have a significant weight, in the region of around 2-6 kg for large format printers. The reciprocating movement of the carriage in use may induce a force to the printing device 102 and in a horizontal direction to the upper ends of the legs 111, 112 of the stand 110 as the carriage decelerates and changes direction. This force may cause a relative swaying motion in the horizontal direction between the printing device 102 at the upper ends of the legs 111, 112 and the bottom of the legs standing in a fixed position in use on the supporting surface, despite the fixing joints of the quadrilateral linkage. This swaying can cause structural damage to the stand 110 can also lead to a lower quality perception of the printed media output from the printing device 102.

Figure 2:
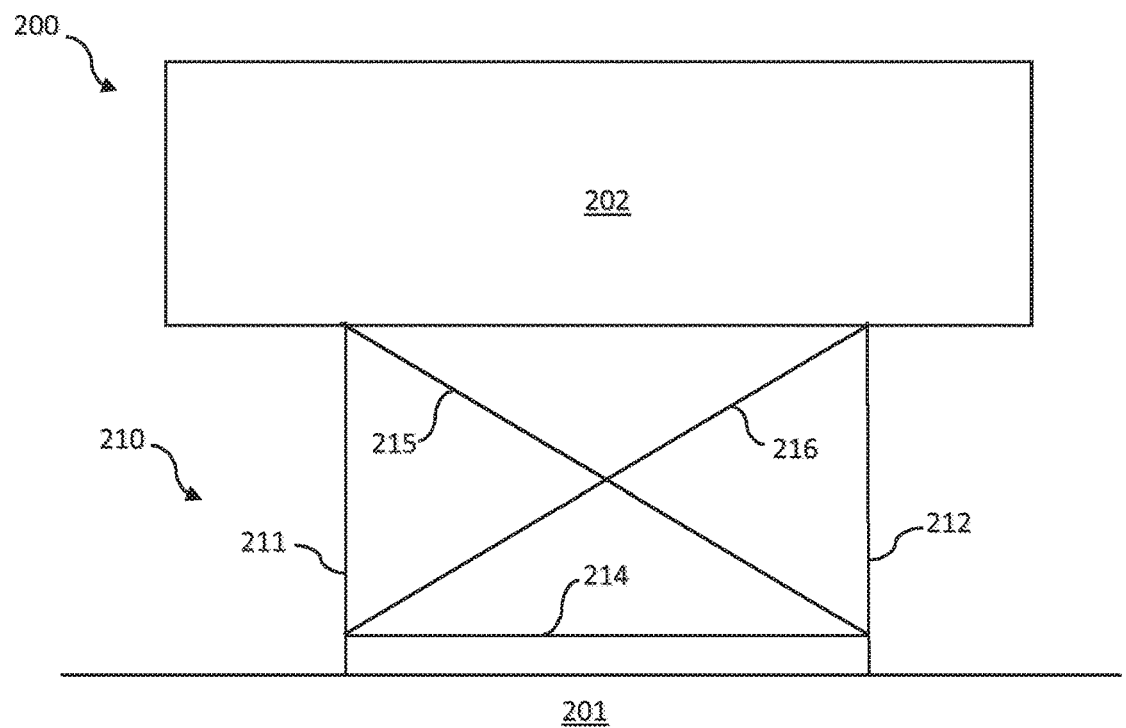
FIG. 2 shows a printer which includes a crossbar and 2 'x'-beams.

FIG. 2 shows a printer 200 which, like the printing device 100 of FIG. 1, comprises a printing device 202 supported by a stand 210 on a supporting surface 201. The stand 210 comprises two legs 211 and 212 and a crossbar 214 connected to and between the legs 211 and 212. The legs 211 and 212 have respective upper ends for vertically supporting the printing device 202 to horizontally span the two legs 211 and 212. The stand 230 further comprises two beams 215 and 216 that together form an 'X' shape. Beam 215 is connected between the upper end of leg 211 and the point where the crossbar 214 is connected to leg 212. Beam 216 is connected between the upper end of leg 212 and the point where the crossbar 214 is connected to leg 211. Beam 215 and beam 216 are connected to each other at the point they cross over. The beams 215 and 216 are thick and heavy to provide structural support to the printing device 202 in use. The beams 215 and 216 together with the two legs 211 and 212, crossbar 214 and printing device 202 provide a planar truss structure formed of triangles that, by virtue of having sides of fixed length, inherently maintain their shape through the components being in tension and compression, and provide reinforcement to the stand and reduce sway in use.

Figure 3:
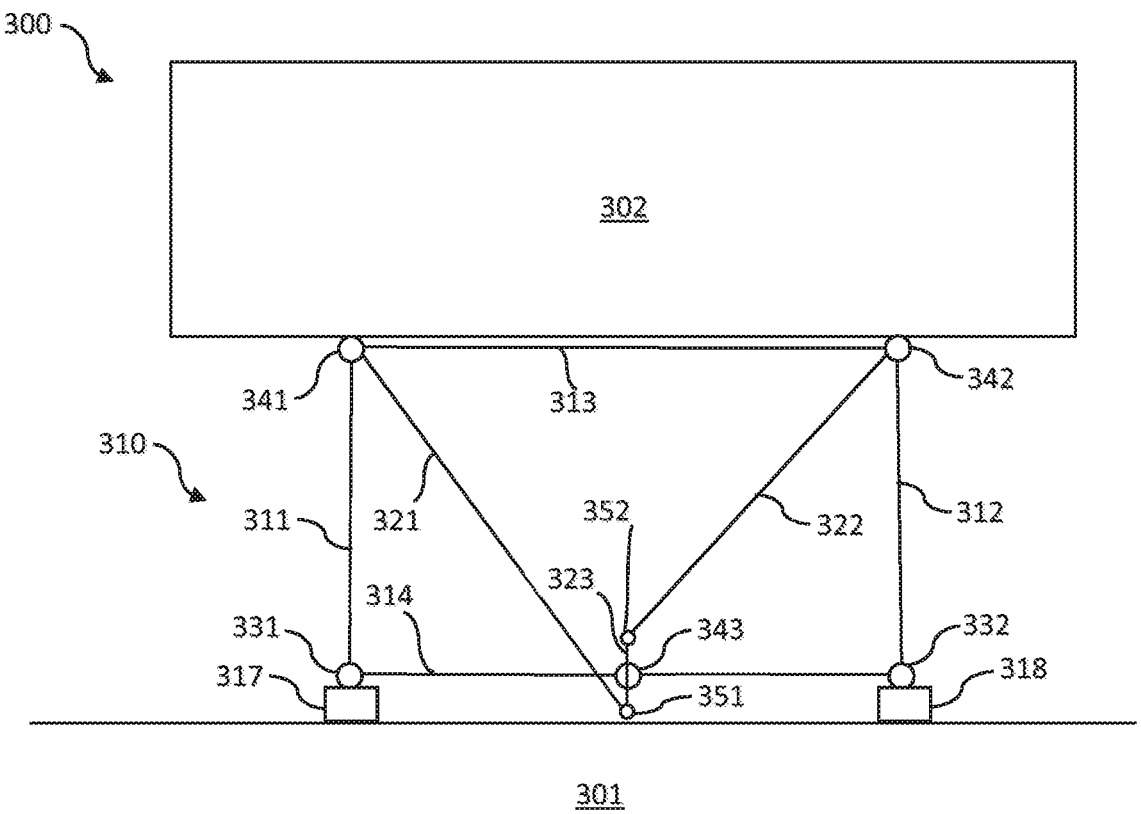
FIG. 3 shows an example of a printer which includes a linkage.

FIG. 3 shows an example printer 300 comprising a printing device 302 supported by a stand 310 on a supporting surface 301. The stand 310 for supporting the printing device 302 has a first leg 311 and a second leg 312, the legs 311, 312 having upper ends for vertically supporting a printing device 302 to horizontally span the legs above the supporting surface 301 in use. The stand also has a crossbar 314 fixed to the first leg 311 at a first crossbar fixation point 331 and fixed to the second leg 312 at a second crossbar fixation point 332.

The printer 300 comprises a linkage 320 connected between the first leg 311 and the second leg 312, the linkage 320 comprising a first link 321, a second link 322 and a third link 323 connected in series. The first link 321 is connected to the first leg 311 in use at a first leg connection point 341; the second link 322 is connected to the second leg 312 in use at a second leg connection point 342. The third link 323 is connected to the crossbar 314 to pivot about a third linkage pivot point 343 and to the first link 321 at a first linkage connection point 351 and to the second link 322 at a second linkage connection point 352. The first linkage connection point 351 and the second linkage connection point 352 are on opposite sides of the third linkage pivot point 343.

In embodiments, the first and second leg connection points 341, 342 of the first and second links 321, 322, are at a height different from the height of the third linkage pivot point 343. In the example shown in FIG. 3, the first and second leg connection points 341, 342, are located at points on the first and second legs 311, 312, which are substantially the same height above the above the supporting surface in use. In the example shown, the first and second leg connection points 341, 342 are proximal to the upper ends of the first and second legs 311, 312, whereas the crossbar 314, which supports the third link 323 at the third linkage pivot point 343, is arranged to be distal from printing device, and proximal to the supporting surface in use. As will be explained in more detail below, this arrangement of the linkage 320 is particularly effective at reducing sway. However, other arrangements are possible, such as an inverse arrangement where the first and second leg connection points 341, 342 are proximate to the supporting surface and the crossbar 314 and the third linkage pivot point 343 is proximate to the printing device 302 in use.

In examples, the first link 321, second link 322, and third link 323 are connected to each other to be free to pivot about the first and second linkage connection points 351, 352. Further, in examples, the first link 321 is connected to the first leg 311 to freely pivot about the first leg connection point 341, and the second link 322 is connected to the second leg 312 to freely pivot about the second leg connection point 352. For example, bolts may be used to attach the different components to allow free pivoting.

In examples, the first leg 311, the second leg 312, the crossbar 314, and the three links of the linkage 320 are rigid and substantially straight. In examples, the crossbar 314 provides a fixed horizontal separation between the first leg 311, and second leg 312 at the first and second crossbar fixation points 331, 332. Further, in examples, the first and second leg connection points 341, 342 may be maintained a fixed distance apart by being coupled to the printing device 302 in use, or by a spacer bar 313 which may be fixed between the upper ends of the legs 311, 312.

In examples, the linkage 320 provides structural support to the stand 310 to act against sway in use. In examples, the linkage in use acts against any forces urging a relative horizontal swaying movement between the printing device 302 supported on the first and second legs 311, 312, and the fixed location where the legs stand on the supporting surface in use. This anti-swaying reinforcement is achieved by the linkage 320 causing horizontal forces applied by the acceleration and deceleration of the carriage to be transferred through the linkage and rotated through 180 degrees, resulting in a restoring force that acts against the forces urging the swaying motion. Compared with the arrangement shown in FIG. 2, less material is needed to provide the linkage 320 that provides resistance to swaying motion, compared with the amount of material needed to provide the 'X' beams shown in FIG. 2. The linkage 320 may also reduce the swaying of the stand 310 in use, compared to, for example to the 'X' beams 215 and 216 in FIG. 2 or the crossbar 114 alone in FIG. 1.

Each of the first leg 311 and the second leg 312 may have feet 317 and 318 for in use standing on substantially fixed points on the supporting surface 301. Thus the stand 310 may be held securely fixed in a location on the supporting surface 301, and therefore, the stand 310 may be more stable in use and the feet 317, 318 may be unmovable on the supporting surface 301 in use. The feet 317, 318 may include rubber mouldings or wheels or casters with brakes to allow the printer 300 to be moved and stopped in a fixed location on the supporting surface 301.

The arrangement of the relatively heavy printing device 302 and the relatively fast traverse speeds of the heavy carriage means that the acceleration and deceleration of the carriage imparts significant horizontal forces onto the stand 310. Further, as the stand 310 is relatively light and so has a low inertial mass, these forces can have a significant effect on the stand 310 causing sway between the print device 302 and the supporting surface 301 on which the stand 310 rests in a fixed location.

The horizontal forces from the printing device 302 are imparted to the stand 310 at the upper ends of the legs 311, 312. The structure of the stand is such that these forces are transferred through the rigidity of the legs 311, 312, crossbar 314 and rigid fixing joints such that the rigidity of the stand 310 provides restoring forces to act against these forces and so reduces the swaying motion. However, the quadrilateral linkage structure formed substantially of the legs 311, 312, crossbar 314 and printing device 302 alone is itself susceptible to deformation due the forces, leading to some swaying motion that could damage the printer 300 and reduce the quality of the output printed substrates.

The linkage 320 is therefore provided and arranged to act against these horizontal forces and substantially reduce the swaying motion that would otherwise occur. The operation of the linkage 320 to reduce sway will now be described.

In examples, as shown in FIG. 3, the first and second leg connection points 341, 342 are located at the upper ends of the legs 311, 312, proximal to the to the printing device 302, whereas the third linkage pivot point 343 is located distal from the printing device 302 on the crossbar 314, which is connected near the lower ends of the legs 311, 312. This provides a height separation between the first and second leg connection points 341, 342, which are provided at substantially the same height, and the third linkage pivot point 343. In other examples, the arrangement may be reversed, such that the third linkage pivot point 343 may be located above the first and second leg connection points 341, 342.

In examples, the structure of the assembled printer 300 or the stand 310 is such that, in use, the first and second leg connection points 341, 342 are held a fixed separation apart. For example, the first and second leg connection points 341, 342 may be held a fixed separation apart by being connected to the printing device 302, or by a spacer bar fixed between the upper ends of the legs 311, 312. As such, in use, the first and second leg connection points 341, 342 move horizontally together and horizontal forces acting on the upper ends of the legs are transferred through from one leg to the other. This means that horizontal forces acting on the upper ends of the legs 311, 312, act on both of them together to cause any swaying motion to occur at the first and second leg connection points 341, 342 simultaneously.

The linkage 320 is configured such that, if the third linkage pivot point 343 were not attached to the crossbar 314 and so were free to move, the motion of the third linkage pivot point 343 is constrained by length and connection locations of the links 321, 322, 323 to move only along a particular path relative to the frame of the fixed first and second leg connection points 341, 342. This path traceable by the third linkage pivot point 343 defines permitted relative motion between the first and second leg connection points 341, 342 and the third linkage pivot point 343.

Depending on the selected configuration of the length of the links 321, 322 and 323, and the distances between the connections between the links and the location of the pivot, the third linkage pivot point 343, if free to move, may be constrained to trace out a path having one a variety of different shapes, the particular shape depending on the configuration of the links. It is possible to configure the linkage such that, the third linkage pivot point 343 may trace out a path that substantially approximates to straight line extending at an angle through a line joining the first and second leg connection points 341, 342 a fixed distance apart.

Figure 4:
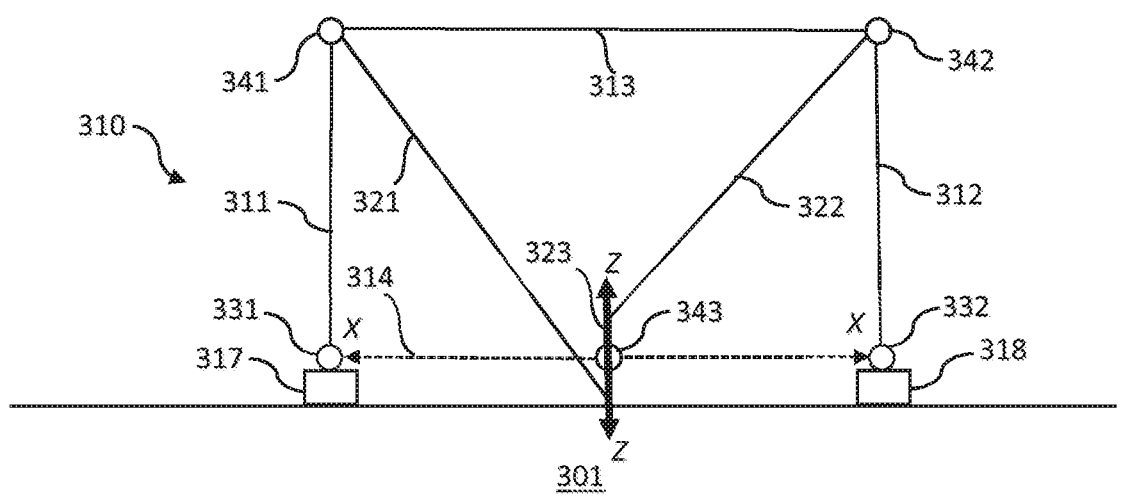
FIG. 4 illustrates the constrained path motion of the third linkage pivot point permitted by the linkage.

This is illustrated in FIG. 4, which shows the example stand 310 with the crossbar 314 omitted. As can be seen, the first and second leg connection points 341, 342, being maintained a fixed distance apart by either the printing device 302 (not shown here) or the spacer bar 313, constrain the path along which the third linkage pivot point 343 may move, in absence of the crossbar 314, to be along the approximately straight vertical line Z-Z. That is, the linkage 320 of examples is configured to substantially permit relative motion between the first and second leg connection points 341, 342 and the third linkage pivot point 343 along the Z-Z direction. In other words, the linkage 320 does not provide any significant return force against relative motion in the Z-Z direction, with the linkages moving and pivoting together to allow motion of the third linkage pivot point 343 along this path. Permitted motion in the Z-Z direction is not material for reducing sway, as the motion of the carriage does not exert forces on the stand in the Z-Z direction.

Referring again to FIG. 4, as a consequence of the linkage 320 permitting relative motion only in the Z-Z direction, it follows that the linkage 320 acts to prevent relative movement between the first and second leg connection points 341, 342 and the third linkage pivot point 343 in any direction away from the Z-Z direction at the location the crossbar 314. More particularly, the linkage 320 acts to prevent relative movement between the first and second leg connection points 341, 342 and the third linkage pivot point 343 in the X-X direction. In this way, the linkage 320 acts against sway between the first and second leg connection points 341, 342 located proximal to the printing device 302, and the third linkage pivot point 343 located proximal to the support surface, on which the stand 310 is held in a fixed location in use. That is, the linkage 320 locks to prevent relative horizontal motion between the printing device (or rather, the adjacent first and second leg connection points 341, 342) and the crossbar 314 (about which the third link 323 pivots).

Of course, the direction of the path of motion permitted by the third linkage pivot point 343 at the crossbar 314 need not be precisely vertical or straight. An arrangement of the linkage 320 defines a path of permitted motion of the third linkage pivot point 343 that does not allow relative horizontal motion between the first and second leg connection points 341, 342 and the third linkage pivot point 343 will cause the linkage 320 to generate restoring forces that reduce sway.

Figure 5A:
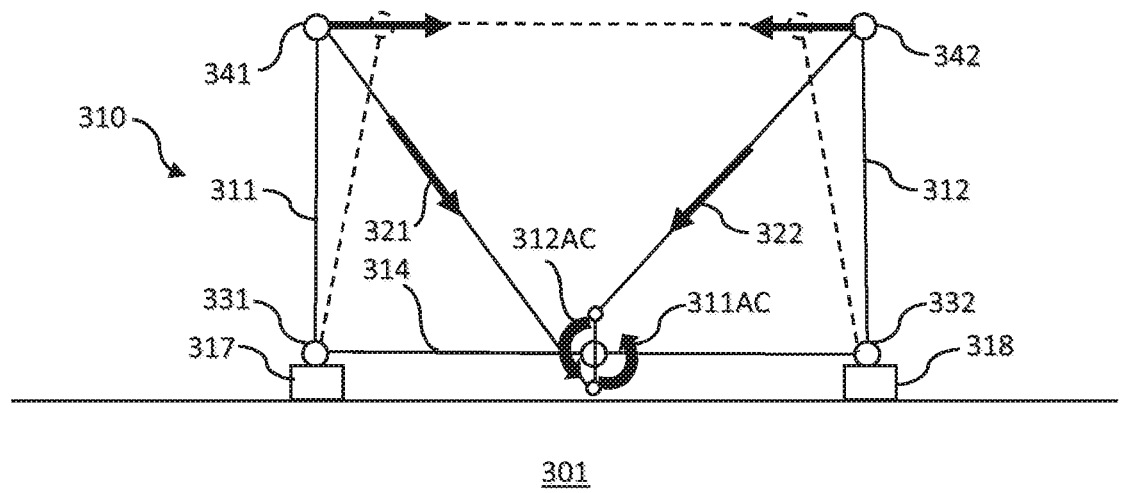
FIGS. 5a and 5b illustrate how the stand of FIG. 3, without the printing device or a spacer bar, can act when a lateral force is applied and how the linkage reacts.
Figure 5B:
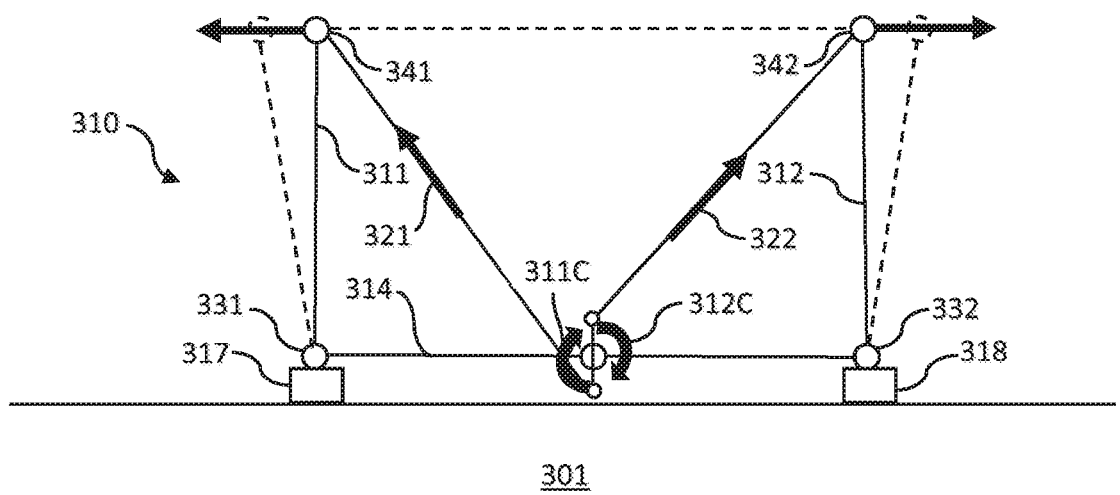

A mechanism by which the linkage 320 generates restoring forces that improve the stability of the stand and reduce sway will now be illustrated and explained with reference to FIGS. 5a and 5b. FIGS. 5a and 5b show examples of how the stand of FIG. 3, when it is not supporting a printing device and without a spacer bar 313 connected between the upper ends of the legs 311 and 312, acts when a lateral force is applied at the upper end of either of the legs 311 and 312 and how the linkage 320 reacts.

The stand 310 of FIGS. 5a and 5b differs from the stand 310 in FIG. 4 in two respects. Firstly, in FIGS. 5a and 5b the crossbar 314 is present, and the third linkage pivot point 343 is connected to the crossbar 314 which restricts the movement of the third link 323 to rotational movement only. Secondly, the first and second leg connection points 341, 342, are not maintained a fixed distance apart by the printing device 302 and/or the spacer bar 313. A dashed horizontal line between the first and second leg connection points 341, 342 shows where a connection would be provided by the printing device and/or the spacer bar.

In FIG. 5a the black arrows shown extending from the first and second leg connection points 341 and 342 indicate "inwards" forces exerted on the upper ends of the legs 311, 312. The "inwards" force can be applied to one or both of the connection points 341 and 342. As will be seen, an "inwards" force on one connection point will be transferred through the linkage to generate an inwards force on the other connection point.

As the legs 311, 312 are stood in a fixed location on the supporting surface, the feet cannot move, and so the "inwards" forces urge the legs 311, 312 to move horizontally about their standing feet, resulting in a deformation of the quadrilateral linkage formed by the legs 311, 312, the supporting surface 301 (or crossbar 314) and where the printing device 302 (or spacer bar 313) would be (shown by the horizontal dashed line). This urged "inwards" movement of the first leg 311 and the second leg 312 is shown by the off-vertical dashed lines in FIG. 5a.

The linkage 320 is arranged to transfer horizontal forces acting at the upper end of one leg indicated by either of the horizontal black arrows, to be exerted in the opposite direction at the upper end of the other legs 311, 312.

As can be seen, a component of the force acting on the upper end of the first leg 311 at the first leg connection point 341 is passed down the first link 321 as indicated by the black arrow, which is then applied to the third link 323 at the first linkage connection point 351. This urges the third link 323 to turn anticlockwise about the third linkage pivot point 343, as indicated by arrow 311AC. In response, the opposite side of the third linkage pivot point 343 at the second linkage connection point 352 also turns anticlockwise about the third linkage point 343, as indicated by arrow 312AC. The third link 323 applies a force in the reverse direction to the second link 322 as indicated by the black arrow. A component of this force is exerted at the second leg connection point 342, as indicated by the black arrow, in the horizontal direction opposite to the force acting at the first leg connection point 341.

The same effect can be seen by following the above steps in reverse order, so that an "inwards" force acting on the upper end of the second leg 312 at the second leg connection point 342 results in a force exerted at the first leg connection point 341, in the horizontal direction opposite to the force acting at the second leg connection point 342.

The linkage 320 thus acts to reinforce an "inwards" movement of both legs 311 and 312, which results in a more stable positioning of the legs 311 and 312 and the quadrilateral linkage, thus improving the stability of the stand 310 and reducing swaying of the stand 310.

FIG. 5b shows that the linkage 320 achieves a similar stabilising and sway reducing effect to that shown in FIG. 5a, when an "outwards" force is applied is applied at the upper end of one or both of the legs 311 and 312.

In FIG. 5b the black arrows shown extending from the first and second leg connection points 341 and 342 indicate "outwards" forces exerted on the upper ends of the legs 311, 312. The "outwards" force can be applied to one or both of the connection points 341 and 342. As will be seen, an "outwards" force on one connection point will be transferred through the linkage to generate an "outwards" force on the other connection point.

As the legs 311, 312 are stood in a fixed location on the supporting surface, the feet cannot move, and so the "inwards" forces urge the legs 311, 312 to move horizontally about their standing feet, resulting in a deformation of the quadrilateral linkage formed by the legs 311, 312, the supporting surface 301 (or crossbar 314) and where the printing device 302 (or spacer bar 313) would be (shown by the horizontal dashed line). This urged "outwards" movement of the first leg 311 and the second leg 312 is shown by the off-vertical dashed lines in FIG. 5a.

The linkage 320 is arranged to transfer horizontal forces acting at the upper end of one leg indicated by either of the horizontal black arrows, to be exerted in the opposite direction at the upper end of the other legs 311, 312.

As can be seen, a component of the force acting on the upper end of the first leg 311 at the first leg connection point 341 is passed up the first link 321 as indicated by the black arrow, which is then applied to the third link 323 at the first linkage connection point 351. This urges the third link 323 to turn clockwise about the third linkage pivot point 343, as indicated by arrow 311C. In response, the opposite side of the third linkage pivot point 343 at the second linkage connection point 352 also turns clockwise about the third linkage point 343, as indicated by arrow 312AC. The third link 323 applies a force in the reverse direction to the second link 322 as indicated by the black arrow. A component of this force is exerted at the second leg connection point 342, as indicated by the black arrow, in the horizontal direction opposite to the force acting at the first leg connection point 341.

The same effect can be seen by following the above steps in reverse order, so that an "outwards" force acting on the upper end of the second leg 312 at the second leg connection point 342 results in a force exerted at the first leg connection point 341, in the horizontal direction opposite to the force acting at the second leg connection point 342.

The linkage 320 thus acts to reinforce an "outwards" movement of both legs 311 and 312, which results in a more stable positioning of the legs 311 and 312 and the quadrilateral linkage, thus improving the stability of the stand 310 and reducing swaying of the stand 310.

FIGS. 5a and 5b show how the linkage 320 acts when the stand is not supporting the printing device, and there is no spacer bar 313. In this situation the first and second leg connection points 341 and 342 are not connected to each other horizontally, and so the transfer of horizontal forces between the leg connection points occurs solely through the linkage 320. However, when the first and second leg connection points 341 and 342 are supporting the printing device 302 (and/or the spacer bar 313 is present), the transfer of horizontal forces between the first and second leg connection points 341 and 342 occurs through the by the printing device 302 (and/or the spacer bar 313), as well as through the linkage 320.

Figure 6A:
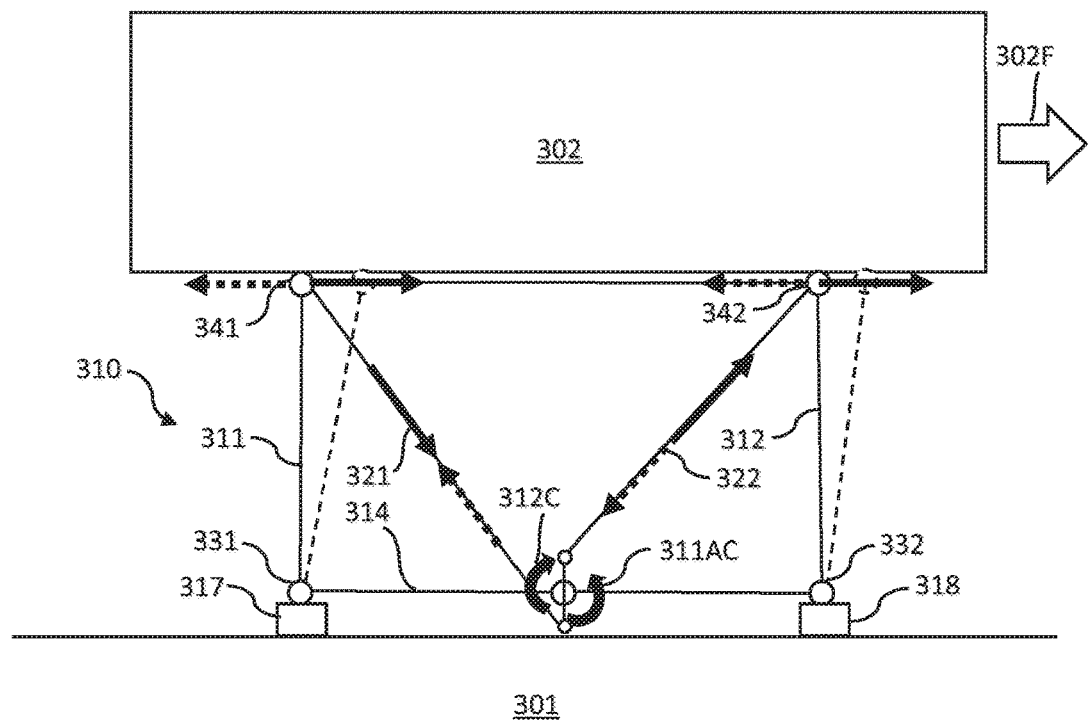
FIGS. 6a and 6b show examples of how the printer of FIG. 3 can act when a lateral force is applied and how the linkage reacts.
Figure 6B:
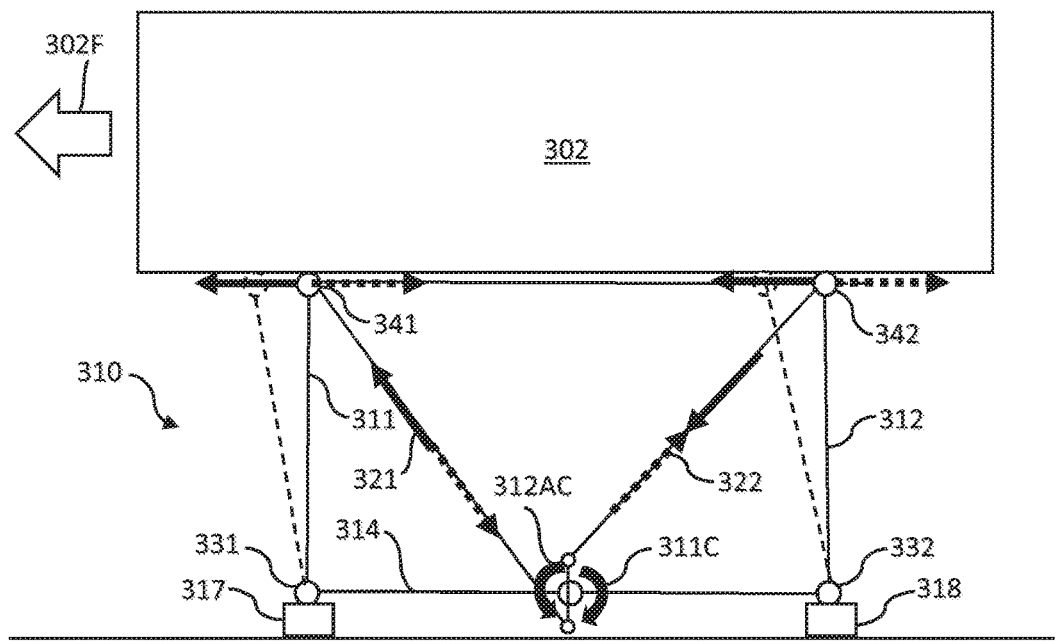

The mechanism by which the linkage 320 acts to prevent the relative horizontal swaying motion between the printing device and the supporting surface when the stand is supporting the printing device will now be explained with reference to FIGS. 6a and 6b. FIGS. 6a and 6b show examples of how the example printer 300 including the linkage 320 may react when a horizontal force is applied by the printing device 302.

In FIG. 6a the arrow 302F shows a lateral force exerted by the printing device 302 to the "right" due to the acceleration or deceleration of the carriage in use. The black arrows shown extending from the first and second leg connection points 341 and 342 indicate the "rightwards" forces exerted in turn on the upper ends of the legs 311, 312 as a result of the force 302F.

As the legs 311, 312 are stood in a fixed location on the supporting surface, the feet cannot move, and so the forces urge the legs 311, 312 to move horizontally about their standing feet, resulting in a deformation of the quadrilateral linkage formed by the legs 311, 312, the supporting surface 301 (or crossbar 314) and the printing device 302 (or spacer bar 313). This urged "rightwards" movement of the first leg 311 and the second leg 312 is shown by the dashed lines in FIG. 6a. This would result in a swaying motion of the printing device 302 relative to the feet of the stand 310 stood in a fixed location on the support surface 301. The dashed lines indicate the deformation of the stand 310 that would have happened absent the linkage 320.

However, the linkage 320 is arranged to act against the forces indicated by the black arrows acting on the upper ends of the legs 311, 312. As can be seen, a component of the force acting on the upper end of the first leg 311 at the first leg connection point 341 is passed down the first link 321 as indicated by the black arrow, which is then applied to the third link 323 at the first linkage connection point 351. This urges the third link 323 to turn anticlockwise about the third linkage pivot point 343, as indicated by arrow 311AC. In response, on the opposite side of the third linkage pivot point 343 at the second linkage connection point 352, the third link 323 applies a force in the reverse direction to the second link 322 as indicated by the dashed arrow. A component of this force is exerted at the second leg connection point 342, as indicated by the dashed arrow, in the horizontal direction opposite to the force 302F applied to the second leg connection point 342 by the printing device 302.

Similarly, as can be seen, a component of the force acting on the upper end of the second leg 312 at the second leg connection point 342 is passed down the second link 322 as indicated by the black arrow, which is then applied to the third link 323 at the second linkage connection point 352. This urges the third link 323 to turn clockwise about the third linkage pivot point 343, as indicated by arrow 312C. In response, on the opposite side of the third linkage pivot point 343 at the first linkage connection point 351, the third link 323 applies a force in the reverse direction to the first link 321 as indicated by the dashed arrow. A component of this force is exerted at the first leg connection point 341, as indicated by the dashed arrow, in the horizontal direction opposite to the force 302F applied to the first leg connection point 341 by the printing device 302.

Thus, in response to the force 302F being applied at the upper ends of legs 311, 312 in a rightwards direction, the linkage 320 locks, with the link 321 in compression and the link 322 in tension, and the links 321, 322 pushing and pulling each other. Each dashed arrow and its opposing solid arrow on links 311 and 312 show that the links 321 and 322 are held in compression and tension respectively. This stiffens the structure of the stand and applies a restoring force to each leg at the upper ends thereof in the opposite direction to the applied force 302F, thus acting against and reducing the swaying motion in the rightwards direction.

Referring now to FIG. 6b, the arrow 302F shows a lateral force exerted by the printer to the "left" due to the acceleration or deceleration of the carriage in use. The black arrows shown extending from the first and second leg connection points 341 and 342 indicate the "leftwards" forces exerted in turn on the upper ends of the legs 311, 312 as a result of the force 302F. The urged "leftwards" movement of the first leg 311 and the second leg 312 is shown by the dashed lines in FIG. 6b. This would result in a swaying motion of the printing device 302 relative to the feet of the stand 310 stood in a fixed location on the support surface 301. The dashed lines indicate the deformation of the stand 310 that would have happened absent the linkage 320.

However, the linkage 320 is arranged to also act against the forces indicated by the black arrows acting on the upper ends of the legs 311, 312. As can be seen, a component of the force acting on the upper end of the first leg 311 at the first leg connection point 341 is passed down the first link 321 as indicated by the black arrow, which is then applied to the third link 323 at the first linkage connection point 351. This urges the third link 323 to turn clockwise about the third linkage pivot point 343, as indicated by arrow 311C. In response, on the opposite side of the third linkage pivot point 343 at the second linkage connection point 352, the third link 323 applies a force in the reverse direction to the second link 322 as indicated by the dashed arrow. A component of this force is exerted at the second leg connection point 342, as indicated by the dashed arrow, in the horizontal direction opposite to the force 302F applied to the second leg connection point 342 by the printing device 302.

Similarly, as can be seen, a component of the force acting on the upper end of the second leg 312 at the second leg connection point 342 is passed down the second link 322 as indicated by the black arrow, which is then applied to the third link 323 at the second linkage connection point 352. This urges the third link 323 to turn anticlockwise about the third linkage pivot point 343, as indicated by arrow 312AC. In response, on the opposite side of the third linkage pivot point 343 at the first linkage connection point 351, the third link 323 applies a force in the reverse direction to the first link 321 as indicated by the dashed arrow. A component of this force is exerted at the first leg connection point 341, as indicated by the dashed arrow, in the horizontal direction opposite to the force 302F applied to the first leg connection point 341 by the printing device 302.

Thus, in response to the force 302F being applied at the upper ends of legs 311, 312 in a leftwards direction, the linkage 320 locks, with the link 311 in tension and the link 312 in compression, and the links 311, 312 pulling and pushing each other. Each dashed arrow and its opposing solid arrow on links 311 and 312 show that the links 311 and 312 are held in tension and compression respectively. This stiffens the structure of the stand and applies a restoring force to each leg at the upper ends thereof in the opposite direction to the applied force 302F, thus acting against and reducing the swaying motion in the leftwards direction.

The linkage 320 thus acts like a reverse motion linkage with a fixed pivot and with the ends of the outer links fixed to each other so that when a force is applied to the ends of both links simultaneously, an equal and opposite force is reflected back by the linkage, meaning that the ends of the first and second links cannot be moved together horizontally relative to the pivot. The restoring force is thus generated by the linkage in 180 degree opposition to the applied force, instantaneously acting against the forces imparted by the printing device 302 to reduce sway.

By positioning the third linkage pivot point 343 on the crossbar 314 close to the supporting surface, the horizontal movement of the pivot point is small even in the presence of a large sway. Then, by arranging the ends of the first and second links 311, 312 where they join the legs at the first and second leg connection points 341, 342, to be high, close to the printing device 302, the magnitude of the sway is kept low. This is because the linkage 320 acts to maintain a fixed positional relation between the first and second leg connection points 341, 342 which, being high and next to the printing device, are subject to the greatest sway, and the third linkage pivot point 343 which, being low and near to the supporting surface 301, is fixed in position. Thus the linkage 320 acts to keep the first and second leg connection points 341, 342 in position relative to the third linkage pivot point 343 which does not move due it being joined to the legs 311, 312 at the height of the first and second crossbar fixing points 331, 332, which are close to the supporting surface 301.

In this arrangement, the first and second links 321 are slightly different in length, and both the first link 321 and the second link 322 may be longer than the third link 323. This arrangement allows relative horizontal motion between the upper ends of the legs and the crossbar near the supporting surface to be prevented.

Other arrangements of the linkage 320 are possible, using the same principle and providing an anti-sway effect. For example, the arrangement could be reversed with the third linkage pivot point 343 being near the printing device 302 and the first and second leg connection points 341, 342 being near the supporting surface 301. Further, the linkage 320 is very similar to a Watt's linkage, in which the first and second links are normally of equal length and the pivot is at the centre of the third link 323 and is located at a height mid-way between the first and second links. A Watt's linkage is designed to cause the pivot point on the third link 323 to be free to move in as near a vertical and straight a line as possible. While a normal Watt's linkage having first and second links of equal length may be used, it is also possible to provide a Watt's linkage having first and second links unequal length by locating the pivot point on the third link 323 proportionally away from the centre to if approximate straight line behaviour is still desired. However, as, in the stand, the third linkage pivot point 343 is not free to move in the vertical direction relative to the first and second leg connection points, this straight line vertical motion is less important. However, provided that the linkage is designed to prevent relative horizontal motion between the first and second leg connection points and the third linkage pivot point 343, an anti-sway effect can be provided.

Tests have been conducted using the linkage arrangement shown in FIG. 3 to stiffen the stand of a large format printer for printing onto a 64 inch (162 cm) substrate, and only 2.20 m of bar was used to form the three links, whereas the equivalent 'X'-bar arrangement required 3.66 m. Further, the magnitude of the sway of the print engine in use was measured by a laser range finder using the anti-sway linkage and it was found to be 0.63 mm, compared to 2.0 mm without the linkage. This compares favourably with the magnitude of sway of 0.8 mm measured when the stand was reinforced by the 'X'-bar arrangement.

In this way, sway can be kept low and output print quality can be kept high using less material.

Thus, the linkage 320 in use may act against any forces urging a relative horizontal swaying between the printing engine supported on the first and second legs, and the feet 317 and 318 standing on the supporting surface 301. In this way, the linkage may be configured to act to substantially prevent relative horizontal swaying movement between: the first and second leg connection points 341 and 342; and the third linkage pivot point 343 located on the crossbar 314. In particular, the linkage 320 may be arranged so that a force urging a horizontal movement of one of the first or second legs 311 or 312 about its fixed location standing on the supporting surface in use is at least partially transferred via the linkage 320 to the other of the first or second legs 311 or 312 to impart a restoring force about its fixed location standing on the supporting surface, in the opposite horizontal direction to the horizontal movement.

The linkage 320 may be configured such that, if the third linkage were detached from the crossbar 314, its pivot point for connection would be, at the location of the crossbar 314, substantially freely moveable in a substantially vertical direction relative to the first and second leg connection points 341 and 342, and is substantially restricted from moving in a horizontal direction relative to the first and second leg connection points 341 and 342. By configuring the linkage 320 so that relative movement between the pivot and the fixed endpoints is permitted only in a substantially vertical direction, the linkage 320 can prevent relative movement in the horizontal direction by locking up when the ends of both the first links are moved, and providing a restoring force in the way described above with reference to FIGS. 6a and 6b.

The third link 323 may be aligned such as to maximise the restoring force provided opposite to the horizontal force applied at the upper ends of the legs. This may be achieved when the third link 323 is approximately vertically aligned when the stand 310 is not in use. However, the alignment that maximises the restoring force depends on the relative positions and lengths of the links and the other components of the stand 310.

At least one of the first leg 311, the second leg 312, the crossbar 314, and the three links of the linkage 320 may be made from a lightweight metal, such as aluminium or an aluminium alloy, or any other suitable lightweight material, such as plastic or wood, which may enable savings in material, weight and transportation costs.

The lighter materials may also be easier for the end user to manipulate during assembly of the stand 310.

The first leg 311 and second leg 312 may further comprise at least one stoppable wheel at the bottom end, to provide contact with the supporting surface 301. This enables the stand 310 to be more easily moveable, especially if the stand 310 is heavy.

The above examples the printer 300, includes the printing device 302 in combination with the legs 311, 312, crossbar 314 and linkage 320. Separately from the printer 300, the legs 311, 312, crossbar 314 and linkage 320 may be considered to provide parts for forming a stand 310 for supporting the printing device 302 which when assembled together provide a printer 300.

The printer 300 may be a large format printer. In examples, the printer 300 may weigh at least 20 kg. In other examples, the printer 300 may weigh at least 40 kg, or at least 60 kg, or at least 80 kg, or at least 100 kg, or at least 125 kg, or at least 150 kg, or at least 1750 kg, or at least 200 kg, or at least 250 kg. In examples, the printing device 302 may print on sheet- or roll-fed substrate. In examples, the printing device 302 may print on substrate having a width of at least 40 cm. In other examples, the printing device 302 may print on substrate having a width of at least 60 cm, or at least 80 cm, or at least 100 cm, or at least 120 cm, or at least 140 cm, or at least 160 cm, or at least 180 cm.

In examples, the carriage of the printing device 302 may have a traverse speed in use of at least 0.5 meters per second. In examples, the carriage may weigh at least 2 kg. In other examples, the carriage may weigh at least 4 kg, while in other examples the carriage may weigh at least 6 kg. Thus, the examples shown in this application may work for large, heavy printing devices that induce a large lateral force at a high frequency, such that swaying is kept to an acceptable level, and the perception of the printing device is acceptable.

Figure 7:
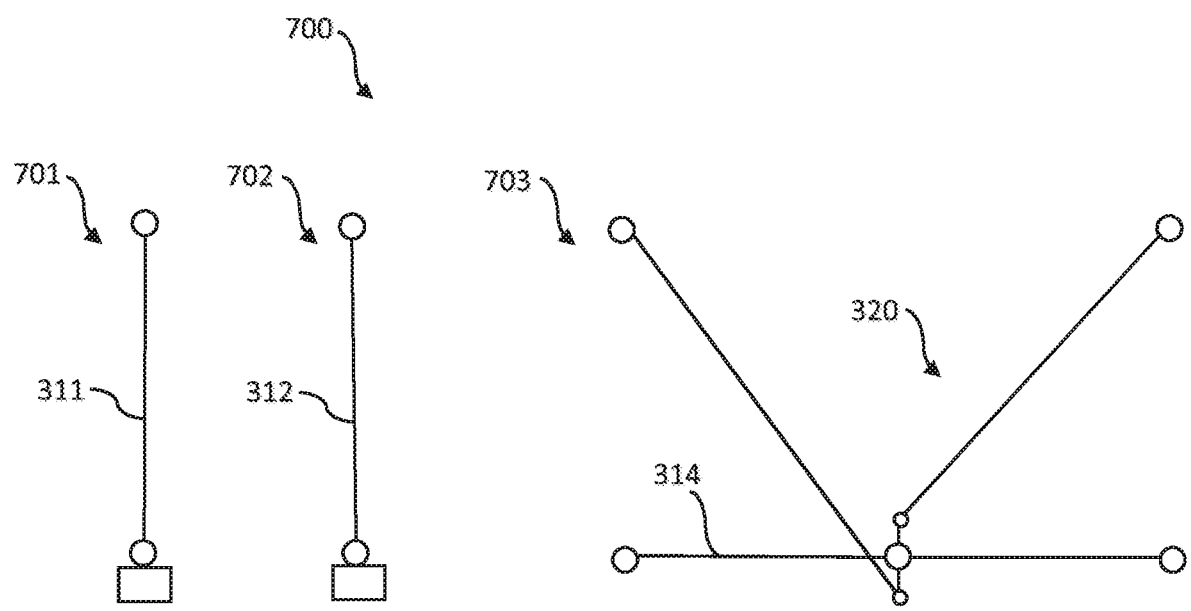
FIG. 7 shows a kit of parts for assembly into a stand for a printing device.

FIG. 7 shows an example of kit of parts 600 for assembly into a stand 310 for a printing device 302.

The kit of parts 700 comprises one or more first parts 701 for providing the first leg 311; one or more second parts 702 for providing the second leg 312; and one or more third parts 703 for providing the linkage 320 and the cross bar 314;

Therefore, the user may assemble the kit of parts 700 into a stand for a printer with just 3 sets of parts 701, 702 and 703. Thus it is more convenient and simpler for the user to assemble the stand 310 than if there were more sets of parts.

Furthermore, in the one of more third parts, the first, second and third links may be pre-assembled and connected to the crossbar about the third linkage pivot point 343. This allows the user assembling the kit of parts 700 to need to make only two connections to join the linkage to the legs. This is fewer user assembly actions than the five connections required to join the X bars of FIG. 2 to the stand, and so this simplifies user assembly.

The invention claimed is:

1. A stand for supporting a printing device, the stand comprising:
    a first leg and a second leg, the legs having upper ends for vertically supporting a printing device to horizontally span the legs above a supporting surface;
    a crossbar fixed to the first leg at a first crossbar fixation point and fixed to the second leg at a second crossbar fixation point; and
    a linkage connected between the first and the second leg, the linkage comprising a first link, a second link and a third link connected in series, wherein:
    the first link is connected to the first leg in use at a first leg connection point;
    the second link is connected to the second leg in use at a second leg connection point; and
    the third link is connected to the crossbar via a third linkage pivot point and pivots about the third linkage pivot point, and the third link is connected to the first and second links at first and second linkage connection points on opposite sides of the third linkage pivot point.

2. A stand according to claim 1, wherein:
    the crossbar provides a fixed horizontal separation between the first leg and second leg at the first and second crossbar fixation points, and the crossbar is arranged to be distal from printing device, and proximal to the supporting surface in use.

3. A stand according to claim 2, wherein the linkage in use acts against any forces urging a relative horizontal swaying between the printing device supported on the first and second legs, and the feet standing on the supporting surface.

4. A stand according to claim 3, wherein the linkage is arranged so that a force urging a horizontal movement of one of the first or second legs about its fixed location standing on the supporting surface in use is at least partially transferred via the linkage to the other of the first or second legs to impart a restoring force about its fixed location standing on the supporting surface, in the opposite horizontal direction to the horizontal movement.

5. A stand according to claim 3, wherein the linkage is configured to act to substantially prevent relative horizontal swaying movement between:
    the first and second leg connection points; and
    the third linkage pivot point located on the crossbar.

6. A stand according to claim 1, the first and second leg connection points being maintained a fixed distance apart in use by the printing device or a spacer bar fixed between the legs proximal to the upper ends of the legs, the first and second leg connection points are proximal to the upper ends of the first and second legs, and each of the first leg and second leg further comprise at least one stoppable wheel at a bottom end, to provide contact with the supporting surface.

7. A stand according to claim 1, wherein the linkage is configured such that, if the third linkage were detached from the crossbar, its third linkage pivot point would be, at the location of the crossbar, substantially freely moveable in a substantially vertical direction relative to the first and second leg connection points, and is substantially restricted from moving in a horizontal direction relative to the first and second leg connection points.

8. A stand according to claim 1, wherein the linkage is a Watts linkage.

9. A stand according to claim 1, wherein the first link is longer than the second link, or vice versa, and both the first link and the second link are longer than the third link.

10. A stand according to claim 9, wherein the first and second leg connection points are located at points on the first and second legs which are substantially the same height above the supporting surface in use, at a height different from the height of the third linkage pivot point.

11. A stand according to claim 1, wherein the first leg, the second leg, the crossbar, and the three links of the linkage are rigid and substantially straight, and wherein at least one of the first leg, the second leg, the crossbar, and the three links of the linkage are made of aluminium or an aluminium alloy.

12. A stand according to claim 1, wherein the first link, second link, and third link are connected to each other to be free to pivot about the first and second linkage connection points, the first link is connected to the first leg to freely pivot about the first leg connection point, and the second link is connected to the second leg to freely pivot about the second leg connection point.

\* \* \* \* \*